United States Patent
Schaffer

(10) Patent No.: US 7,538,941 B2
(45) Date of Patent: May 26, 2009

(54) METHOD AND ARRANGEMENT FOR POSITIONING A STRUCTURE TO BE IMAGED

(75) Inventor: Joerg Schaffer, Goettingen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 219 days.

(21) Appl. No.: 11/548,133

(22) Filed: Oct. 10, 2006

(65) Prior Publication Data

US 2007/0146840 A1    Jun. 28, 2007

(30) Foreign Application Priority Data

Oct. 11, 2005    (DE) .................. 10 2005 048 922

(51) Int. Cl.
| | |
|---|---|
| G02B 21/00 | (2006.01) |
| G02B 7/04 | (2006.01) |
| G02B 27/40 | (2006.01) |
| G02B 27/64 | (2006.01) |
| G01J 3/30 | (2006.01) |

(52) U.S. Cl. ............... 359/383; 250/201.3; 356/317
(58) Field of Classification Search ............ 359/383, 359/368; 250/201.3; 356/317
See application file for complete search history.

(56) References Cited

U.S. PATENT DOCUMENTS

| | | | | |
|---|---|---|---|---|
| 6,762,831 B2 * | 7/2004 | Shibata et al. | ........... | 356/237.2 |
| 2004/0196365 A1 * | 10/2004 | Green et al. | .............. | 348/79 |

FOREIGN PATENT DOCUMENTS

| | | |
|---|---|---|
| DE | 100 38 527 | 8/2000 |
| EP | 0 842 497 | 4/2002 |

* cited by examiner

*Primary Examiner*—Alessandro Amari
(74) *Attorney, Agent, or Firm*—Reed Smith LLP

(57) ABSTRACT

The invention is directed to a method and a device for imaging structures either in the focal plane of the objective of a microscope or in the pupil of the objective or in the respective conjugate planes. For this purpose, the optical data of the imaging systems and the illumination wavelengths or fluorescence wavelengths are taken into account when determining the optimal position of the structures.

7 Claims, 2 Drawing Sheets

METHOD AND ARRANGEMENT FOR POSITIONING A STRUCTURE TO BE IMAGED

CROSS-REFERENCE TO RELATED APPLICATION

This application claims priority of German Application No. 10 2005 048 922.2, filed Oct. 11, 2005, the complete disclosure of which is hereby incorporated by reference.

a) Field of the Invention

The present invention is directed to a method and an arrangement for imaging structures either in the focal plane of the objective of a microscope or in the pupil of the objective and in the respective conjugate planes. The structure to be projected is generally positioned in the field diaphragm plane or aperture diaphragm plane as a conjugate object plane or pupil plane. The "structured illumination" described in EP 842 497 is an example of the imaging of a structure in the object plane.

b) Description of the Related Art

Depending on the correction characteristics of the optics used for imaging, particularly the objective and its longitudinal chromatic aberration, the structure to be imaged must be displaced along the optical axis to ensure sharp imaging in the focal plane or pupil plane of the microscope depending upon the illumination spectrum. An appropriate solution is described in the present Applicant's DE 100 38 527 A1 whose disclosure is hereby incorporated in its entirety by reference. In this solution, the location for the best imaging of the structure on the object is determined empirically in the form of a calibration and is adjusted manually or by motor.

Fluorescing objects present a particularly complicated case because in this instance the excitation wavelength (or the excitation wavelength region), which is at the same time the imaging wavelength of the structure, deviates from the emission wavelength (or the emission wavelength region) of the specimen to be observed, since the imaging and therefore the focusing of the observation beam path on the specimen is carried out at the emission wavelength, but the projection of the structure is carried out at the excitation wavelength. In this case, the reference position of the structure depends on the excitation wavelength and also on the emission wavelength of the fluorescence and must be calibrated with the respective fluorescing object or a suitable reference specimen.

OBJECT AND SUMMARY OF THE INVENTION

It is the primary object of the invention to overcome the disadvantages of the prior art and to automatically determine and adjust the optimal position of a structure to be imaged on the specimen particularly for fluorescing specimens.

This object is met according to the invention by the method for positioning a structure to be imaged on an object in the illumination beam path of a microscope comprising the following steps: entering and determining optical data of an objective used for observation and of the optical system provided for illumination, particularly the longitudinal chromatic aberration CHL; entering and determining the wavelength or wavelength region provided for the illumination light; determining the optimal position of the structure to be imaged from the optical data of the objective, the optical system provided for illumination, and the wavelength or wavelength region; and positioning of the structure of this optimal position.

The object is also achieved by the device in accordance with the invention, for positioning a structure to be imaged on an object in the illumination beam path of a microscope comprising means for entering and/or determining optical data of an objective used for imaging, means for entering and/or determining optical data of a wavelength or wavelength region provided for illumination, means for determining the optimal position of the structure to be imaged while taking into account the optical data and the wavelength provided for illumination and means for positioning the structure on the optimal position.

In a particularly advantageous manner, the optical data of the optical systems serving to image the structure are included in the determination of the optimal position in the structure. In this way, an automatic optimal positioning of the structure in the illumination beam path while taking into account the parameters which substantially affect the imaging is made possible for the first time.

It is particularly advantageous that the difference between the excitation wavelength and the emission wavelength (Stokes shift) is taken into account when imaging the structure on a fluorescing specimen.

The invention will be explained more fully in the following with reference to the drawing.

DESCRIPTION OF THE PREFERRED EMBODIMENTS

Figure 1:
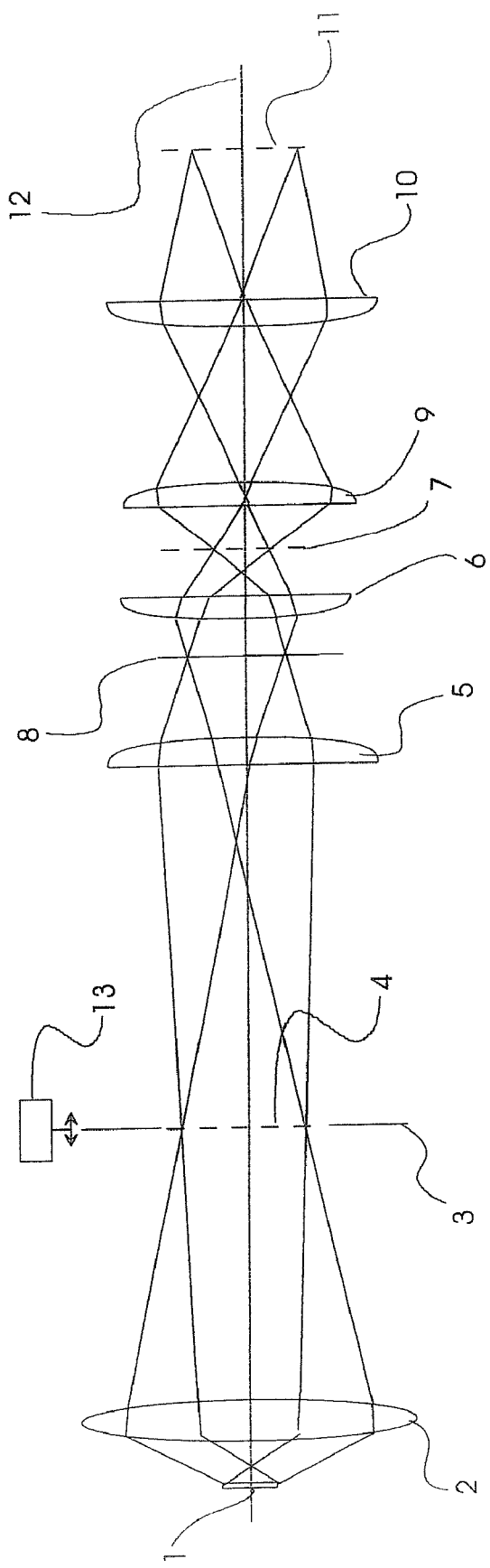
FIG. 1 schematically shows the beam path of a fluorescence microscope.

The structure 4 located in the field diaphragm plane 3 is illuminated by means of a light source 1 via a lens or a lens system 2 and is imaged on the specimen plane 7 by means of the illumination optics 5, 6 (the latter can also contain an objective, e.g., in incident illumination). An excitation filter 8 allows only the desired wavelength or the desired wavelength region of the illumination light to impinge on the specimen. The light proceeding from the specimen 7 is imaged on the intermediate image plane 11 by the objective 9 and the tube lens 10. This intermediate image is then observed or electronically detected by apparatus not shown in the drawing.

As a result of the longitudinal chromatic aberration of the optical elements taking part in the imaging, the optimal position of the structure 4 to be imaged differs for different illumination wavelengths and/or emission wavelengths, and these differences must be compensated by displacing the structure 4 along the optical axis 12 as is indicated by the arrows 13. The displacement is generally carried out by motor-operated means which are not shown in the drawing and which are controlled by a computer 13 which carries out the necessary calculations.

The correction status and, therefore, the longitudinal chromatic aberration of objectives and other optical systems can be parameterized with knowledge of the optical design. In this way, reference positions for a structure to be projected can be determined from a set of parameters describing the correction state for every combination of objective, excitation wavelength, emission wavelength (or corresponding spectral regions) so that it is no longer necessary to calibrate all of these combinations.

The method according to the invention is illustrated in the following using the example of the longitudinal chromatic aberration CHL and the imaging of a structure (for example, a transmission grating) in the object plane.

In order to determine the above-mentioned parameter set, the CHL is calculated for a set of wavelengths by means of the known optical design of the optical system in question, which comprises an objective and incident illumination optics and tube lens. This is carried out at two locations:

1) the intermediate image plane ZB, and
2) the field diaphragm plane LFB.

When focusing the object (reflection or fluorescence) at the emission wavelength, the CHL at the ZB is compensated by the focusing process. The net displacement path Δ of the structure to be positioned at the location of the structure (with reference to the LFB plane) is given by:

$$\Delta = CHL(LFB, \lambda_{excitation}) - CHL(ZB, \lambda_{emission})\frac{\beta^2(\text{illumination})}{\beta^2(\text{detection})},$$

where β(illumination)/β(detection) is the quotient of the imaging scales of the respective partial optics.

The following table shows corresponding data for an optical system:

| λ(nm) | CHL(ZB) | β(detection) | CHL(LFB) | β(illumination) |
|---|---|---|---|---|
| 365.00 | −0.47 | −63.75 | 0.17 | −24.41 |
| 404.66 | −0.24 | −64.27 | 0.04 | −24.45 |
| 435.83 | −0.59 | −64.45 | −0.06 | −24.44 |
| 486.13 | −0.56 | −64.56 | −0.08 | −24.42 |
| 546.07 | 0.00 | −64.58 | 0.00 | −24.39 |
| 643.85 | 0.72 | −64.53 | 0.14 | −24.36 |
| 706.52 | 0.67 | −64.48 | 0.17 | −24.35 |
| 750.00 | 0.34 | −84.44 | 0.15 | −24.34 |

In case of reflection, $\lambda_{excitation}$ must equal $\lambda_{emission}$ because the light coming from the specimen has the same wavelength as the illumination light, that is, the values are taken from the same row of the table.

In case of fluorescence, the values for illumination and detection are to be taken from different rows (corresponding to the respective wavelength) and determined by interpolation.

Figure 2:
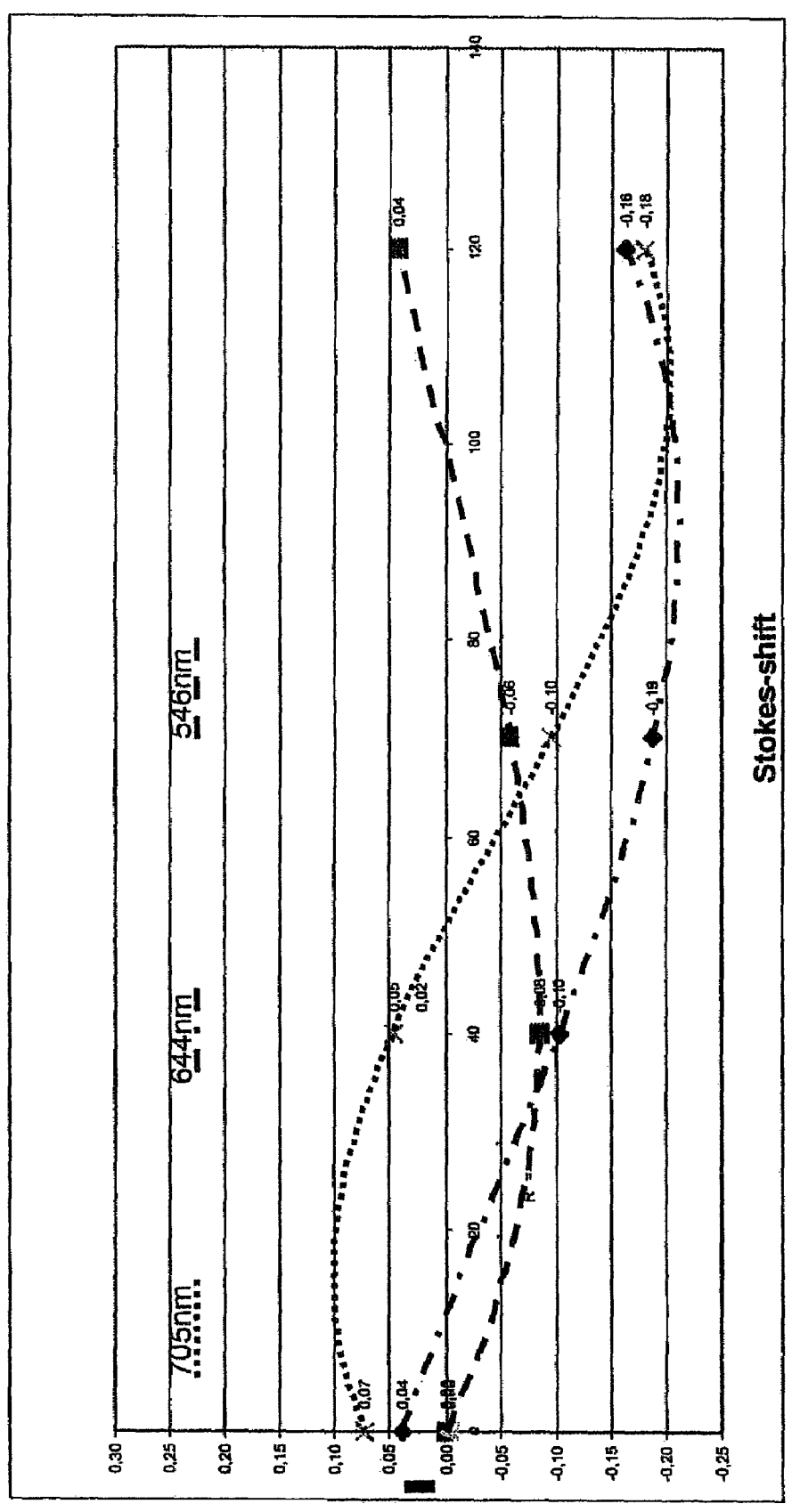
FIG. 2 is a graphic depiction of the dependency of the desired position of the structure on the difference between excitation wavelength and emission wavelength (stokes-shift)

In order to simplify the calculation, curves which indicate the dependency of the reference position of the structure on the difference between the excitation wavelength and emission wavelength (Stokes shift) are extracted from the table. FIG. 2 shows a family of curves of this kind. It shows the reference positions of the structure to be projected in mm as a function of the Stokes shift. The various curves show different emission wavelengths (705 nm, 644 nm and 546 nm).

These curves are adapted to polynomial equations by known methods in order to obtain values which are also calculable for intermediate values of the Stokes shift. Using these polynomial equations for the respective curves, the reference positions of the structures to be projected are determined for the respective combinations of wavelengths and known objective CHL corresponding to the adjustment of the microscope and are adjusted preferably by motor. In this way, automated sequences can be realized in a very simple manner without the need for elaborate calibrations.

The corresponding values and calculation algorithms are stored in the computer 13 and are implemented by the latter.

Another application example for the method according to the invention is positioning structures in a conjugate pupil plane for influencing the illumination. In this case, it is useful to be able to position the inserted optics in the illumination beam path corresponding to the occurring aberrations in order to obtain results with the fewest possible errors (diaphragms, ring illumination, generally illumination which is structured in this sense).

While the foregoing description and drawings represent the present invention, it will be obvious to those skilled in the art that various changes may be made therein without departing from the true spirit and scope of the present invention.

What is claimed is:

1. A method for positioning a structure to be imaged on an object in the illumination beam path of a microscope, comprising the following steps:
    a) entering and determining optical data of an objective used for observation and of an optical system provided for illumination, including the longitudinal chromatic aberration CHL;
    b) entering and determining the wavelength or wavelength region provided for an illumination light;
    c) determining the optimal position of the structure to be imaged from the optical data of the objective, the optical data of the optical system provided for illumination, and the wavelength or wavelength region; and
    d) positioning of the structure at this optimal position.

2. The method for positioning according to claim 1, wherein, for fluorescing objects, the respective emission wavelength associated with the respective illumination wavelength is entered or determined in addition, and these emission wavelengths are taken into account when determining the optimal position.

3. The method for positioning according to claim 1, wherein emission wavelengths are taken into account according to the formula $$\Delta = CHL(LFB, \lambda_{excitation}) - CHL(ZB, \lambda_{emission})\frac{\beta^2(\text{illumination})}{\beta^2(\text{detection})},$$

where Δ is the additional displacement path for the structure, CHL(LFB, $\lambda_{excitation}$) is the longitudinal chromatic aberration for the excitation wavelength $\lambda_{excitation}$ at the location of the field diaphragm, CHL(ZB, $\lambda_{emission}$) is the longitudinal chromatic aberration for the emission wavelength $\lambda_{emission}$ at the location of the intermediate image plane, β(illumination) is the imaging scale of the optical system provided for illumination, and β(detection) is the imaging scale of the optical system provided for detection.

4. A device for positioning a structure to be imaged on an object in an illumination beam path of a microscope, comprising:
    means for entering and/or determining optical data of an objective used for imaging;
    means for entering and/or determining optical data of a wavelength or wavelength region provided for illumination;
    means for determining the optimal position of the structure to be imaged while taking into account the optical data and the wavelength provided for illumination; and
    means for positioning the structure on the optimal position.

5. The device for positioning according to claim 4, wherein additional means are provided for entering and determining the emission wavelength associated with the illumination wavelength, and the means for determining the optimal position take this emission wavelength into account.

6. The device for positioning according to claim 4, wherein the means for determining the optimal position contain a computer which is connected to the input device and the positioning means.

7. A microscope having microscope components and further comprising a device for positioning according to claim 4.

* * * * *